United States Patent [19]

Grögler et al.

[11] Patent Number: 4,882,411

[45] Date of Patent: Nov. 21, 1989

[54] PROCESS FOR THE PRODUCTION OF COLD-SETTING POLYURETHANE UREA ELASTOMERS

[75] Inventors: Gerhard Grögler; Andreas Ruckes; Heinrich Hess, all of Leverkusen; Richard Kopp, Cologne, all of Fed. Rep. of Germany

[73] Assignee: Bayer Aktiengesellschaft, Bayerwerk, Fed. Rep. of Germany

[21] Appl. No.: 245,877

[22] Filed: Sep. 16, 1988

[30] Foreign Application Priority Data

Sep. 29, 1987 [DE] Fed. Rep. of Germany ....... 3732727

[51] Int. Cl.⁴ .............................................. C08G 18/10
[52] U.S. Cl. ........................................ 528/54; 528/68; 528/76; 528/77; 528/83
[58] Field of Search .................... 528/64, 68, 76, 77, 528/83

[56] References Cited

U.S. PATENT DOCUMENTS

| | | | |
|---|---|---|---|
| 3,004,939 | 10/1961 | Varvaro | 260/22 |
| 3,105,062 | 9/1963 | Graham et al. | 260/75 |
| 3,891,606 | 6/1975 | Kegon | 260/77.5 |
| 3,926,922 | 12/1975 | Baron et al. | 260/77.5 |

FOREIGN PATENT DOCUMENTS

| | | |
|---|---|---|
| 2635400 | 2/1978 | Fed. Rep. of Germany . |
| 70009195 | 1/1975 | Japan . |

*Primary Examiner*—Maurice J. Welsh
*Attorney, Agent, or Firm*—Gene Harsh; Joseph C. Gil; Thomas W. Roy

[57] ABSTRACT

The present invention relates to a process for the production of polyurethane urea elastomers from (a) NCO-terminated prepolymers based on polyisocyanates and polyethers having a molecular weight of 400 to about 10,000 and an ethylene oxide content of about 10 to 60 mole-% and (b) solid diaminodiphenyl ureas corresponding to the formula

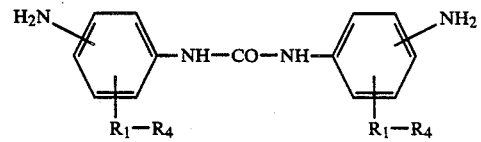

wherein $R_1$, $R_2$, $R_3$ and $R_4$ may be the same or different and represent hydrogen or $C_1$-$C_6$ alkyl radicals and wherein the amino groups are in the m-and/or p-position to the urea group, characterized in that the NCO prepolymers are reacted with the diaminodiphenyl ureas in powder-form in a heterogeneous phase at temperatures of about 5° to 40° C.

The present invention is also directed to the polyurethane urea elastomers prepared by this process.

8 Claims, No Drawings

PROCESS FOR THE PRODUCTION OF COLD-SETTING POLYURETHANE UREA ELASTOMERS

BACKGROUND OF THE INVENTION

1. Field of the Invention

This invention relates to a technically simplified process for the production of cold-setting polyurethane urea elastomers in which high-melting aromatic diamines present in solid phase are reacted with isocyanate prepolymers in a heterogeneous reaction.

2. Description of the Prior Art

The production of polyurethane urea elastomers from polyisocyanates, relatively high molecular weight polyhydroxyl compounds and aromatic diamines is known. To guarantee reasonable processing times for reactive systems of the starting components mentioned, the most widely used reactive aromatic isocyanates are generally reacted with sluggishly reacting diamines. The diamines which have been successfully used in practice for this purpose include aromatic diamines in which the basicity and, thus, reactivity to isocyanates has been reduced by the introduction of halogen or carboxy substituents. 3,3'-dichloro-4,4'-diaminodiphenylmethane (MOCA), previously the most widely used aromatic diamine, is mentioned as an example.

U.S. Pat. No. 3,891,606 describes the crosslinking of NCO prepolymers of polyhydroxyl compounds and an excess of polyisocyanates with aromatic diamines in which the reactivity to isocyanate groups is reduced by complexing with certain alkali metal salts. The disadvantage of this process lies in the fact that it is confined to two particular aromatic diamines. In addition, the complex between the aromatic diamine and the alkali metal salt has to be prepared in a separate process step.

Another way of controlling the reaction velocity between polyisocyanatets and aromatic diamines is to carry out the reaction in an organic solvent. Corresponding processes are described, for example, in U.S. Pat. No. 3,926,922 and in published Japanese patent application 9195/70. The disadvantage of using organic solvents is obvious. First, the risk of fire and explosions is increased and, second, technically elaborate recovery of the solvent is necessary on economic and ecological grounds.

Previously, little has been known of the production of polyurethane ureas by the reaction of polyisocyanates with aromatic diamines in a heterogeneous phase. According to the prior art, the relatively high-melting aromatic diamines of commercial interest are either used in dissolved form, which involves the disadvantages just described, or are reacted with polyisocyanates in the melt. The processing of aromatic diamines in the melt is described, for example, in the above-cited U.S. Pat. No. 3,926,922 and in DE-AS 1,122,699.

DE-AS 1,122,699 relates to a process for the production of polyurethane elastomers by crosslinking liquid isocyanate prepolymers by reaction with mixtures of primary diamines and compounds containing several hydroxyl groups in molds, in which a dispersion of a powder-form crystalline diamine in a liquid polyester or polyether containing several hydroxyl groups or in castor oil is introduced into the prepolymer at a temperature below the melting point of the diamine and the resulting mass is hardened in known manner at temperatures above the melting point of the diamine in the mixture. In this process, therefore, the actual "amine crosslinking" again takes place in a liquid homogenous phase. The disadvantage of the process according to DE-AS 1,122,699 lies in particular in the high temperatures required for the processing of high-melting diamines such as 1,5-naphthylene diamine (Mp. 189° C.) or 4,4'-diaminodiphenyl ether (Mp. 186° C.) because experience has shown that decomposition reactions occur to a considerable extent in the polyurethane at these temperatures, uncontrollably altering the mechanical properties of the end products.

U.S. Pat. No. 3,105,062 describes a process for the production of polyurethane ureas in which relatively high molecular weight preadducts containing isocyanate groups are preferably reacted with aromatic diamines in a heterogeneous phase. The reaction mixtures harden at a temperature which the "2-phase system" changes into a "1-phase system". This temperature is generally in the range from 100° to 170° C.

However, the aromatic diamines mentioned in U.S. Pat. No. 3,105,062 are soluble, albeit to a limited extent, in the reaction medium (NCO preadduct) so that uncontrollable preliminary reactions occur during the mixing of the two components, even at room temperature. The result is that the reaction mixtures thicken up in a very short time, paste-like formulations being obtained in some cases. Such formulations are difficult to process by the usual casting technique and, accordingly, have to be brought into the required shape by application of pressure before they are actually hardened by application of heat. According to U.S. Pat. No. 3,105,062, the stability of the thickened reaction mixtures in storage (pot life) is sufficient for further processing (molding under pressure, coating) and amounts to several hours. It can be seen form the examples provided that the reaction mixtures in question are preferably reaction mixtures which have a maximum pot life of about 1 hour. Accordingly, they cannot be regarded as long-term stable systems.

In U.S. Pat. No. 3,105,062, it is specifically pointed out that the use of the diamines mentioned, which are present in solid form only, in a one-shot process gives unsatisfactory polyurethane moldings. In this case, the unwanted preliminary reaction of the diamine with the diisocyanate takes place to a greater extent such that the poorly soluble polyurea precipitates in the reaction mixture and ceases to react.

DE-OS 2,635,400 describes another process for the production of polyurethane urea elastomers, in which aromatic diamines are reacted as chain-extending agents in a one-shot or multistep process. This process is characterized in that the aromatic diamines are present in solid form in the reaction mixtures and have a melting point about 130° C. The thermosetting of these mixtures takes place at a temperature in the range from 80° to 120° C., i.e. below the melting point of the aromatic diamine. By virtue of the choice of these diamines as chain-extending agents, there is no mixture-thickening preliminary reaction with the NCO preadduct (NCO prepolymer). Accordingly, systems such as these may also be readily processed by casting. Since the pot life of these reactive systems is considerably increased, it is possible in this process to use many aromatic diamines which have been very difficult to process by previously known techniques.

It can be seen from the examples of DE-OS 2,635,400 that the pot life of the liquid reaction mixtures varies from a few minutes to several hours in a certain temperature range, depending on the reactivity or solubility of the aromatic diamine. Under standard processing conditions, for example in hand casting, these reaction mixtures, particularly when they have relatively long pot lives, can generally be processed without major difficulties. By contrast, processing becomes difficult when, as a result of machine stoppages or other enforced interruptions, there is a relatively long interval between preparation of the reaction mixtures and the hardening phase. Accordingly, the need for a long processing time at low temperature and for a short setting time at elevated temperature is becoming increasingly more urgent in practice.

The final PUR plastics are generally required to show good mechanical properties and, in many cases, a thermal stability adapted to the application envisaged. In the prior art, the thermal stability of PUR elastomers depends largely on the type of chain-extending agent used. When glycolic chain extenders for example are used for the production of elastomers, the PUR moldings obtained show lower thermal stability than when compounds containing the amino groups are used. There are of course also distinct differences in regard to thermal stability within the particular type of chain-extending agents (either compounds containing OH or $NH_2$ groups).

Many diamines varying in their constitution are mentioned in DE-OS 2,635,400 as suitable chain extenders for the production of polyurethane urea elastomers. 2,2'-diaminodiphenylurea is mentioned as the only representative of a diaminodiphenylurea and no example is provided.

Investigation of the application has shown that the reaction of an NCO preadduct with the diaminodiphenylurea mentioned above gives an elastic PUR molding characterized by entirely acceptable mechanical properties. However, the thermal stability of these elastomers is unexpectedly poor.

Even when the molding is conditioned at 120° to 130° C., there is a significant reduction in its mechanical properties after only a short time. At 140°-150° C., only a viscous melt is present, irrespective of whether the sample is hot or cold.

Two-component polyurethane urea casting systems (PUR casting systems) which react at room temperature or moderately elevated temperature, which may be formulated to have a pot life (casting time) of any length and which harden rapidly (tack-free and scuff-resistant, surface-dry) after the hardening process has started, are already known. The previously described "cold-setting" systems of long pot life all have the disadvantage that either the casting time is no longer than 20 or 30 minutes or the final solidification takes several days.

Accordingly, an object of the present invention is to provide a two-component PUR casting system which comes as close as possible to the ideal cold-hardening two-component PUR casting system, i.e., one having a long or adjustable pot life at room temperature and a short setting time.

More particularly, therefore, an object of the present invention is to provide a process for the production of polyurethane ureas in which the processing time of the reaction mixtures is at least several hours, preferably at least 8 hours (long-term stable system). It is also an object that the liquid reaction mixtures be able to be set at an economical rate at low reaction temperatures.

Another object of the invention is to provide suitable chain-extending agents containing amino groups and also suitable starting components (NCO preadducts). These NCO preadducts should only dissolve the solid chain extender minimally at room temperature without the polyadducts formed in small quantities leading to clumping or any significant increase in the viscosity of the mixture. The solid chain extender is required to change into the dissolved reactive form very slowly and continuously at room temperature. Because the reaction between the two reactants takes place in heavily diluted medium, the polyurethane urea is synthesized very slowly. On the other hand, however, the system should harden to its final state at an economical rate.

A final object of the present invention is to provide a process for the production of polyurethane urea elastomers in which high-quality elastomers having high thermal stability are obtained.

It has now surprisingly been found that finely divided diaminodiphenyl ureas corresponding to the formula

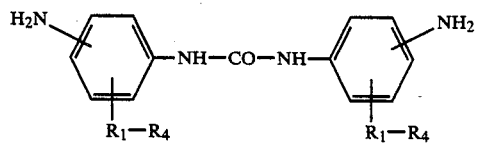

wherein $R_1$, $R_2$, $R_3$ and $R_4$ may be the same or different and represent hydrogen radicals and wherein the $NH_2$ groups are in the m- and/or p-position to the urea group, provide reaction mixtures which are stable in storage for long periods in combination with NCO preadducts.

SUMMARY OF THE INVENTION

The present invention relates to a process for the production of polyurethane urea elastomers from (a) NCO-terminated prepolymers based on polyisocyanates and polyethers having a molecular weight of 400 to about 10,000 and an ethylene oxide content of about 10 to 60 mole-% and (b) solid diaminodiphenyl ureas corresponding to the formula

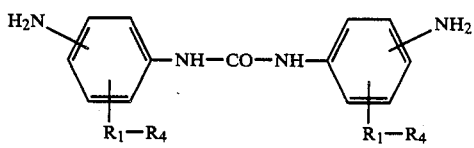

wherein $R_1$, $R_2$, $R_3$ and $R_4$ may be the same or different and represent hydrogen or $C_1$-$C_6$ alkyl radicals and wherein the amino groups are in the m-and/or p-position to the urea group, characterized in that the NCO prepolymers are reacted with the diaminodiphenyl ureas in powder-form in a heterogeneous phase at temperatures of about 5° to 40° C.

The present invention is also directed to the polyurethane urea elastomers prepared by this process.

DETAILED DESCRIPTION OF THE INVENTION

The above reactive systems are stable in storage for at least 2 hours. If, by contrast, the chain-extending agents according to the invention are added in dissolved form to the NCO preadducts, they behave in the same way as normal aromatic diamines. The reaction mixture crosslinks after a few seconds and the resulting gel-like product is no longer processable.

Accordingly, the reactivity of the diaminodiphenyl ureas present in heterogeneous phase to the NCO groups of the relatively high molecular weight preadducts is of only minor importance to obtaining the long pot life of the reaction mixtures according to the invention. The crosslinking velocity is largely determined by the tendency of the diamines to dissolve in the reaction mixture. As a result, the stability of the reaction mixtures in storage is also dependent to a very large extent upon the type of polyol on which the NCO preadduct is based. By using suitable polyols, it is possible to influence the crosslinking time or in other words the crosslinking temperature of the mixtures as required.

When commercially available polypropylene glycol ethers (based on propylene oxide and $H_2O$, for example) are used in the preparation of the NCO preadducts, one-component systems storable at room temperature are obtained in admixture with suitable diaminodiphenyl ureas. However, the mixtures such as these only set after prolonged application of heat at the predetermined temperatures. Uncontrollable secondary reactions involving the NCO preadduct (such as trimerization, allophanatization, etc.) can occur in the meantime, so that unsatisfactory elastomers are obtained.

However, this long setting time can be considerably shortened, for example, by using propylene glycol ethers additionally containing ethylene oxide units as starting components. The character of the one-component system is not affected. In addition, "cold setting" is made possible by the presence of ethylene oxide units.

On the other hand, the use of pure polypropylene glycol ether is advisable when the compounds containing $NH_2$ groups shows slightly better solubility than described in the above cases. This also applies when polyesters, for example polyadipates, are used for the preparation of the NCO preadduct. In this case, the processing characteristics of the mixtures may be significantly influenced by the choice of the low molecular weight glycols (esterification components).

Under no circumstances, however, should preliminary thickening occur through premature polyaddition of the reaction mixtures when the two reaction components (NCO preadduct and aromatic diamine) are mixed at room temperature or moderately elevated temperature.

The diaminodiphenyl ureas suitable for the purposes of the invention are prepared by methods known per se. For example, nitroanilines may be converted into the corresponding dinitrodiphenyl ureas by reaction with phosgene or diphenyl carbonate and subsequently converted into the desired diaminodiphenyl ureas by reduction. Another generally applicable method is the reaction of aminoacetanilides with phosgene or diphenyl carbonate with subsequent alkaline hydrolysis of the acetamide group to the desired product.

One method which is particularly simple and therefore preferred for the preparation of the ureas according to the invention comprises reacting p- or m-diamines with urea, as described in U.S. Pat. No. 1,617,847 (in an invert solvent or in the melt) or U.S. Pat. No. 2,503,797 (in sulfuric acid or neutral aqueous solution).

Due to the production method, however, relatively high molecular weight polynuclear products corresponding to the formula

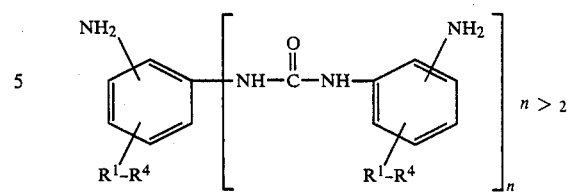

are generally formed in addition to the monomeric diaminodiphenyl ureas. Although they do not have any adverse effect on the properties of the elastomers within certain limits, the proportion of ureas in which n=1 to 3 should be at least 60% by weight, based on the total quantity. However, ureas containing as high a proportion of "monomers" (n=1) as possible are preferred.

The diaminodiphenyl ureas which accumulate in solid form are generally first finely ground, for example in a ball mill, to an average particle size of about 1 to 50 μm, preferably about 3 to 10 μm.

Examples of preferred diamines for the preparation of the ureas according to the invention include p-phenylenediamine, m-phenylenediamine, 2,5-diaminotoluene, 2,4-diaminotoluene, 2,6-diaminotoluene, 1-methyl-3,5-diethyl-2,6-diaminobenzene and 1,3,5-triethyl-2,4-diaminobenzene. The diamine powders obtained may be directly mixed with the NCO preadduct. Alternatively, they may advantageously be applied in the form of a suspension containing a portion of the high molecular weight polyol on which the NCO preadduct is based.

It is of course also possible to use mixtures of the above-mentioned diaminodiphenyl ureas and other chain-extending agents known in PUR chemistry containing at least two isocyanate-reactive hydrogen atoms a molecular weight of 60 to 399.

For the process according to the invention for the production of heat-stable polyurethane ureas, the above-mentioned solid diaminodiphenyl ureas according to DE-OS 3,429,149 may also be used in retarded form. Thus, the diaminodiphenyl ureas may be treated (for example in an inert solvent or preferably in suspension in a high molecular weight polyol) with small quantities of a suitable polyisocyanate before they are used as chain extenders. As a result of this treatment, a thin polyurea skin acting as an anti-diffusion layer is formed on the particle surface of the diamine. This anti-diffusion layer is destroyed at a certain temperature or even by surface dissolution to initiate the hardening of the mixture.

The diaminodiphenyl ureas (either in powder form or in the form of a suspension in polyol) which have been modified (retarded) in this way, in combination with NCO preadducts, give reactive systems which have distinctly longer stability in storage than systems in which the chain extender is not provided with an anti-diffusion layer.

The polyhydroxyl compounds suitable for use in the process according to the invention for the production of the NCO preadducts are preferably polyalkylene oxide ethers present in liquid form at room temperature or moderately elevated temperature and having a molecular weight of 400 to about 10,000, preferably about 600 to 6000. The polypropylene glycol ethers contain a certain proportion of ethylene oxide units in the molecule. Preferably the polyalkylene oxide ethers have an ethylene oxide content of about 10 to 60 mole-%, preferably about 10 to 30 mole-%.

Polythioethers, polyacetates, polyesters, polycarbonates and polyester amides may also be used. All these polyhydroxyl compounds are known per se for the production of homogeneous and cellular polyurethanes. It is of course possible to use mixtures of the above-mentioned compounds containing at least two isocyanate-reactive groups and having a molecular weight of 400 to about 10,000, for example mixtures of polyethers and polyesters.

Other starting components which may be used in accordance with the invention include aliphatic, cycloaliphatic, araliphatic, aromatic and heterocyclic polyisocyanates of the type described for example by W. Siefken in Justus Liebigs Annalen der Chemie, 562, pages 75 to 136. Examples include ethylene diisocyanate, 1,4-tetramethylene diisocyanate, 1,6-hexamethylene diisocyanate, 1,12-didecane diisocyanate, cyclobutane-1,3-diisocyanate, cyclohexane-1,3- and -1,4- diisocyanate and mixtures of these isomers, 1-isocyanato-3,3,5-trimethyl-5-isocyanatomethyl cyclohexane (DAS 1,202,785), 2,4-and/or 2,6-hexahydrotoluylene diisocyanate, hexahydro-1,3- and/or -1,4-phenylene diisocyanate, perhydro-2,4'- and/or -4,4'-diphenylmethane diisocyanate, 1,3- and 1,4-phenylene diisocyanate, 2,4- and/or 2,6-toluylene diisocyanate, diphenyl methane-2,4'- and/or 4,4'-diisocyanate, naphthylene-1,5-diisocyanate, triphenylmethane-4,4',4''-triisocyanate,-polyphenyl- polymethylene polyisocyanates of the type obtained by the phosgenation of aniline-formaldehyde condensates and described for example in GB-PS 874,430 and 848,671, perchlorinated aryl polyisocyanates of the type described, for example, in DE-AS 1,157,601, polyisocyanates containing carbodiimide groups of the type described in DE-PS 1,092,007, diisocyanates of the type described in U.S. Pat. No. 3,492,330, polyisocyanates containing allophanate groups of the type described, for example, in GB-PS 994,890, BE-PS 761,626 and published Dutch patent application 7,102,524, polyisocyanates containing isocyanate groups of the type described, for example, in DE-PS 1,002,789, 1,222,067 and 1,027,394 and in DE-OS 1,929,034 and 2,004,048, polyisocyanates containing urethane groups of the type, described, for example, in BE-PS 752,261, or U.S. Pat. No. 3,394,164, polyisocyanates containing acylated urea groups according to DE-PS 1,230,778, polyisocyanates containing biuret groups of the type described, for example, in DE-PS 1,101,394, GB-PS 889,050 and in FR-PS 7,017,514, polyisocyanates formed be telomerization reactions of the type described, for example, in BE-PS 723,640, polyisocyanates containing ester groups of the type described for example in GB-PS 965,474 and 1,072,956, U.S. Pat. No. 3,567,763 and DE-PS 1,231,688 and also reaction products of the above-mentioned isocyanates with acetals according to DE-PS 1,072,385.

It is also possible to use the distillation residues containing isocyanate groups obtained in the commercial production of isocyanates, optionally in solution in one or more of the above-mentioned polyisocyanates. Mixtures of these polyisocyanates may also be used.

In general, it is particularly preferred to use the commercially obtainable polyisocyanates such as 2,4- and 2,6-toluylene diisocyanate and mixtures of these isomers ("TDI"), polyphenyl polymethylene polyisocyanates of the type obtained by phosgenation of aniline-formaldehyde condensates ("crude MDI") and polyisocyanates containing carbodiimide groups, urethane groups, allophanate groups, isocyanurate groups, urea groups or biuret groups ("modified polyisocyanates").

The polyisocyanates or rather the isocyanate prepolymers prepared from the above-mentioned polyisocyanates and the above-mentioned relatively high molecular weight and/or low molecular weight polyols should be present in liquid form during the reaction with the powder-form or suspended aromatic diamine.

Where polyurethane foams are to be produced by the process according to the invention, water and/or readily volatile organic compounds are used as blowing agents. Suitable organic blowing agents include acetone, ethyl acetate, methanol, ethanol, halogen-substituted alkanes (such as methylene chloride, chloroform, ethylidene chloride, vinylidene chloride, monofluorotrichloromethane, chlorodifluoromethane and dichlorodifluoromethane), butane, hexane, heptane or diethyl ether. The blowing effect may also be obtained by the addition of compounds which decompose at elevated temperatures with the elimination of gases (such as nitrogen), for example, azo compounds such as azoisobutyronitrile. Further examples of blowing agents and information on the use of blowing agents can be found in Kunststoff-Handbuch, Vol. VII, published by Vieweg and Höchtlen, Carl-Hanser-Verlag, München 1966, for example on pages 108 and 109, 453 and 455 and 507 to 510.

According to the invention, catalysts may also be used. Suitable catalysts are those known per se, for example tertiary amines such as triethyl amine, tributyl amine, N-methyl morpholine, N-ethyl morpholine, N,N,N',N'-tetramethyl ethylenediamine, 1,4-diazabicyclo-(2,2,2)-octane,N,N-dimethyl-N'-dimethylaminoethyl piperazine, N,N-dimethyl benzyl amine, bis-(N,N-diethylaminoethyl)-adipate, N,N-diethylbenzyl amine, pentamethyl diethylenetriamine, N,N-dimethylcyclohexylamine, N,N,N-',N'-tetramethyl-1,3-butane diamine, N,N-dimethyl-β-phenylethyl amine, 1,2-dimethyl imidazole and 2-methyl imidazole.

Tertiary amines containing isocyanate-reactive hydrogen atoms include triethanolamine, triisopropanolamine, N-methyl diethanolamine, N-ethyl diethanolamine, N,N-diethyl ethanolamine, reaction products of these tertiary amines with alkylene oxides such as propylene oxide and/or ethylene oxide.

Other suitable catalysts are sila-amines containing carbon-silicon bonds of the type described, for example, in DE-PS 1,229,290, such as 2,2,4-trimethyl- 2-sila-morpholine and 1,3-diethylaminomethyl tetramethyl disiloxane.

Other suitable catalysts include nitrogen-containing bases such as tetraalkyl ammonium hydroxides, alkali hydroxides such as sodium hydroxide, alkali phenolates such as sodium phenolate or alkali alcoholates such as sodium methylate. Hexahydrotriazines may also be used as catalysts.

According to the invention organometallic compounds more especially organotin compounds, may also be used as catalysts.

Preferred organotin compounds include tin(II) salts of carboxylic acids such as tin(II) acetate, tin(II) octoate, tin(II) ethyl hexoate and tin(II) laurate, an the dialkyl tin salts of carboxylic acids such as dibutyl tin diacetate, dibutyl tin dilaurate, dibutyl tin maleate or dioctyl tin diacetate.

Further representatives of catalysts suitable for use in accordance with the invention and information on the way in which the catalysts work can be found in Kunststoff-Handbuch, Vol. VII, published by Vieweg and Höchtlen, Carl-Hanser-Verlag, München 1966, for example on pages 96 to 102.

The catalysts are generally used in a quantity of about 0.001 to 10% by weight, based on the quantity of polyhydroxyl compounds having a molecular weight of 400 to about 10,000.

According to the invention, it is also possible to use surface-active additives (emulsifiers and foam stabilizers). Suitable emulsifiers include the sodium salts of castor oil sulfonates or fatty acids or salts of fatty acids with amines such as diethyl amine oleate or diethanolamine stearate. Alkali or ammonium salts of sulfonic acids (such as didecylbenzenesulfonic acid or dinaphthylmethanedisulfonic acid), or fatty acids (such as ricinoleic acid) or polymeric fatty acids may also be used as surface-active additives.

Suitable foam stabilizers include water-soluble polyether siloxanes. The structure of these compounds is generally such that a copolymer of ethylene oxide and propylene oxide is attached to a polydimethyl siloxane residue. Foam stabilizers such as these are described, for example, in U.S. Pat. No. 2,764,565.

According to the invention, it is also possible to use reaction retarders, for example, acid-reacting compounds such as hydrochloric acid or organic acid halides, cell regulators such as paraffins, fatty alcohols or dimethylpolysiloxanes; pigments or dyes, and flameproofing agents such as trischloroethyl phosphate or ammonium phosphate or polyphosphate; stabilizers against the effects of aging and weather; plasticizers; fungistatic and bacteriostatic agents; and fillers such as bariuim sulfate, kieselguhr, carbon black or whiting.

Further examples of surface-active additives and foam stabilizers, cell regulators, reaction retarders, stabilizers, flameproofing agents, plasticizers, dyes, fillers, fungistatic and bacteriostatic agents, which may optionally be used in accordance with the invention, and information on the use of such additives and the way in which they work can be found in Kunststoff-Handbuch, Vol. VI, published by Vieweg and Höchtlen, Carl-Hanser-Verlag, München 1966, for example on pages 103 to 113.

According to the invention, the reaction components are reacted by the one-shot process, the prepolymer process or the semi-prepolymer process, often using machines, for example the type described in U.S. Pat. No. 2,764,565. Information on processing machines which may also be used in accordance with the invention can be found in Kunststoff-Handbuch, Vol. VI, published by Vieweg and Höchtlen, Carl-Hanser-Verlag, München 1966, for example on pages 121 and 205.

In the process according to the invention, the quantities of reaction components are generally selected so that the molar ratio of polyisocyanates to chain extender plus compound(s) containing reactive OH groups is generally between about 0.7 to 1.5, preferably between about 0.90 and 1.15, depending on the particular processing technique applied. The percentage NCO content of the prepolymer when the prepolymer stage is involved is about 1.8 to 6% by weight. The molar ratio of reactive hydrogen in the chain extender to reactive OH groups may vary within wide limits and should preferably be between about 0.4 and 1.5, in which case flexible to rigid polyurethanes are obtained. In addition to the diamines to be used in accordance with the invention, other diamines or even diols, for example those mentioned above in reference to the preparation of the polyhydroxyl compounds, may also be partly used as chain extenders. However, the mole fraction of the amine according to the invention in the chain extender should be between about 50 and 100%, preferably between about 80 and 100%.

The process according to the invention may be carried out very easily. The polyol component containing at least two hydroxyl groups and having a molecular weight of 400 to 10,000 is reacted in known manner with an excess of diisocyanate to form the NCO preadduct. The course of the reaction may be monitored by NCO titration. On completion of the polyaddition, the diaminodiphenyl urea is introduced in the form of a solid powder (particle size about 5 to 50 $\mu$m) using a suitable stirrer and the suspension formed thoroughly mixed.

However, it is also possible initially to mix the solid diamine powder in a little of the high molecular weight liquid polyol on which the NCO preadduct is based. The paste or castable suspension thus obtained may then be added to the NCO preadduct. The advantage of this process is that it is easy to carry out. The ratio of diaminodiphenyl urea to polyol is about 1.0:0.5 to 1.0:5.0, preferably about 1.0:1.0 to 1.0:2.0.

The temperature at which the chain extender is added depends on the state of the NCO preadduct.

With liquid NCO preadducts, the chain extender (as such or preferably in suspension in polyol) is added at room temperature. With highly viscous or solid NCO prepolymers, the chain extender is added at the temperature at which satisfactory casting of the mixtures is guaranteed. This temperature should not exceed 50° to 60° C. Under no circumstances, however, should there by any preliminary reaction of the NCO prepolymers and the aromatic diamine because any uncontrollable increase in the viscosity of the mixture complicates further processing by the normal casting technique. A short time after addition of the diamine, the reaction mixture is degassed in vacuo.

The processing time (pot life) of the systems depends upon the type of diaminodiphenyl urea and the NCO preadduct. The processing temperature should not of course be too high because preliminary reactions cannot then be ruled out.

The processing of the reactive systems according to the invention depends upon their state. Liquid systems castable at room temperature may be processed by casting, optionally being briefly heated before casting. Systems which can no longer be cast, but which still flow can be applied to any desired substrates, for example using a coating knife (coatings, coverings). Plastic systems (pastes) may be processed under pressure in molds (for example in the case of sealing compounds).

The systems are hardened at ambient temperature. The hardening time is about 10 to 24 hours (dry surface). However, it depends upon the state of the NCO preadduct and upon the chain extender. The hardened parts acquire their final properties after about 1 week.

Elastomers produced in accordance with the invention may be used for a variety of applications, for example, for moldings subjected to severe mechanical stressing such as tires, rollers, V-belts or seals subjected to severe thermal or chemical stressing, for hot water pipes or motors or for the production of films, textile coatings and polyurethane powders.

The chain-extending reaction may also be carried out in the presence of the above-described blowing agents and additives, preferably in closed molds, in which case foams having a cellular core and a compact skin are formed.

The elastic and semi-elastic foams obtainable by the process according to the invention are used, for example, as upholstery materials, mattresses, packaging materials and, by virtue of their flame resistance, also for applications where these properties are particularly important, for example in automobile and aircraft construction and transportation in general. The foams may be produced either by in-mold foaming or may be fabricated from block-foamed material.

The process according to the invention is illustrated by the following Examples in which figures are to be understood as parts by weight or percentages by weight.

EXAMPLES

Example 1 (Comparison Example)

200 g of an NCO preadduct (NCO content 3.5%) of a linear polypropylene glycol ether (MW 2000, OH number 56) and 2,4-diisocyanatotoluene were thoroughly mixed at room temperature with 30.2 g of finely ground 3,3'-diamino-4,4'-dimethyldiphenyl urea (particle size 10–30 μm). The 3,3'-diamino-4,4'-diphenyl urea still contained oligomeric fractions (~60% n=2, ~25% n=3, and ~15% n=4).

The resulting suspension was degassed by water jet vacuum. The viscosity buildup of this reaction mixture was determined.

| 1st day (production) = 25,500 Cp/RT | } substantially |
| 2nd day = 28,000 | } stable in |
| 3rd day = 28,500 | } storage |
| 4th day = 29,300 | |
| 6th day = 32,800 | |
| 8th day = 58,000 | |

According to these figures, the reaction mixture was substantially stable in storage for about 4 days. The mixture can only be hardened by application of heat. A highly elastic polyurethane urea was obtained after about 1 to 2 hours at 120° to 130° C.

Example 2

To prepare the NCO preadduct, the polypropylene glycol ether mentioned in Example 1, consisting solely of propylene oxide units, was replaced by polyethers containing ethylene oxide units in addition to the propylene oxide units. The NCO preadducts based on 2,4-diisocyanatotoluene (NCO content 3.4 to 3.6%) prepared by standard methods now show a completely different hardening profile in combination with 3,3'-diamino-4,4'-dimethyldiphenyl urea.

| NCO preadduct | % EOx | Solidification behavior/time | | | | | |
| | | ½ h. | 1 h. | 2 h. | 3 h. | 4.5 h. | Overnight |
| 1. PPG ether | — | — | — | — | — | — | + |
| 2. PPG ether | 7.5 | — | — | — | — | — | ++ |
| 3. PPG ether | 13 | — | — | — | + | + | +++ |
| 4. PPG ether | 25 | — | — | + | ++ | +++ | ++++ |
| 5. PPG ether | 43 | + | ++ | ++ | +++ | +++ | ++++ |

| NCO preadduct | % EOx | Solidification behavior/time | | | | | |
| | | ½ h. | 1 h. | 2 h. | 3 h. | 4.5 h. | Overnight |

+ = slight viscosity buildup
++ = strong viscosity buildup
+++ = crosslinked, highly viscous
++++ = elastic, crosslinked The processing time and also the hardening time of the reaction mixture at room temperature may be controlled through the ethylene oxide (EOx) content of the polypropylene glycol ether.

A long pot life (approx. 3 hours at room temperature) and an entirely acceptable hardening time (overnight) were obtained when the polypropylene glycol ether contained approximately 25% EOx units. Smaller contents led to a long pot life with a very long hardening time. Although higher contents of EOx units promoted rapid hardening, they do so at the expense of the processing time. Both alternatives are undesirable in practice.

Example 3

200 g of an NCO preadduct prepared from toluylene diisocyanate (TDI) and a linear polypropylene glycol ether additionally containing 20% ethylene oxide units (NCO content 3.6%) were homogeneously mixed at room temperature with 32 g finely ground 3,3'-diamino-4,4'-dimethyl diphenyl urea. The mixture was briefly degassed in vacuo and then poured into a mold coated with release agents. The pot life of the liquid reaction mixture was 2 to 3 hours at room temperature. After storage for about 10 hours at room temperature, the test specimen could be removed form the mold. The completely bubble-free molding (0.5–1 cm layer thickness) had a Shore A hardness of 84. Overnight the Shore A hardness increased to around 87–88. The test specimen then had a dry surface and highly elastic properties.

Even after further storage of the test specimen at room temperature, there was very little change in its hardness (increase 87–89 Shore A after 1 week).

The highly elastic polyurethane urea elastomer had acquired its final properties after this time at the latest. As the mechanical values show, the property level of these "cold-set" elastomers were comparable with those of a system obtained after 2–3 hours at 120° C., followed by conditioning.

| Physic. values | "Cold setting" (after 1 week) | "Thermosetting" (2 h/120° C.) |
|---|---|---|
| Modulus (100%), MPa | 6.9 | 7.7 |
| Tensile strength, MPa | 7.1 | 8.7 |
| Elongation at break, % | 400 | 450 |
| Tear propagation resistance, KN/m | 35.7 | 33.7 |
| Elasticity, % | 50 | 56 |
| Hardness (Shore A) | 89 | 90 |

Example 4

200 g of an NCO preadduct which was liquid at room temperature (NCO 3.3%, viscosity 50,000 Cp/RT) and had been prepared from TDI and a linear polyester of adipic acid and a mixture of ethylene glycol and butanediol (molar ratio 1:1) were thoroughly mixed with 27.6 g 3,3'-diamino-4,4'-dimethyl diphenyl urea. A suspension which could just be cast at room temperature was obtained and readily lended itself to application by knife coating or trowelling. The mixture had a pot life of 2 hours. Coatings applied to a substrate in layer thicknesses of 1 to 3 mm hardened in 15 to 20 hours at room temperature. The hardened coating was scuff-resistant and showed highly elastic properties. The polyurethane urea elastomer had a Shore A hardness of 85 to 90.

Although the invention has been described in detail in the foregoing for the purpose of illustration, it is to be understood that such detail is solely of that purpose and that variations can be made therein by those skilled in the art without departing from the spirit and scope of the invention except as it may be limited by the claims.

What is claimed is:

1. A process for the preparation of a polyurethane urea elastomer from a mixture comprising
    (a) an NCO-terminated prepolymer based on a polyisocyanate and a polyether polyol having a molecular weight of 400 to about 10,000 and an ethylene oxide content of about 10 to 60 mole-% and
    (b) a solid diaminodiphenylurea corresponding to the formula

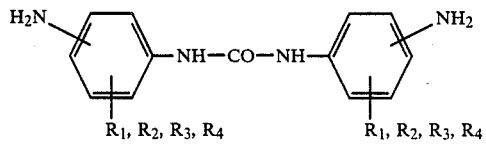

wherein $R_1$, $R_2$, $R_3$ and $R_4$ may be the same or different and represent hydrogen or a $C_1$-$C_6$ alkyl radical and wherein the amino groups are in the m- and/or p-position to the urea group,
which comprises reacting said NCO-terminated prepolymer with said diaminodiphenyl urea in a heterogeneous phase at a temperature of about 5° to 40° C.

2. The process of claim 1 wherein said polyethers are polypropylene/polyethylene glycol ethers having a molecular weight of about 1000 to 6000.

3. The process of claim 2 wherein said ethylene oxide content is about 10 to 30 mole-%.

4. The process of claim 1 wherein said diaminodiphenyl urea is present in the form of a suspension in said polyether such that the ratio by weight of diaminodiphenylurea to polyol is about 1.0:0.5 to 1.0:5.0.

5. The process of claim 1 wherein said diaminodiphenyl urea is present in the form of a suspension in said polyether such that the ratio by weight of diaminodiphenyl urea to polyol of about 1.0:1.0 to 1.0:2.0.

6. The process of claim 1 wherein said diaminodiphenyl urea comprises 3,3'-diamino-4,4'-dimethyldiphenyl urea.

7. The process of claim 3 wherein said diaminodiphenyl urea comprises 3,3'-diamino-4,4'-dimethyldiphenyl urea.

8. The process of claim 4 wherein said diaminodiphenyl urea comprises 3,3'-diamino-4,4'-dimethyldiphenyl urea.

* * * * *